Oct. 17, 1961    G. B. PETERSON    3,004,738
AIRCRAFT LANDING WHEEL ROTATING MEANS
Filed July 20, 1960    2 Sheets-Sheet 1

INVENTOR

Gerald B. Peterson

INVENTOR
Gerald B. Peterson

United States Patent Office 3,004,738
Patented Oct. 17, 1961

3,004,738
AIRCRAFT LANDING WHEEL ROTATING MEANS
Gerald B. Peterson, Riverside, Ill.
Filed July 20, 1960, Ser. No. 44,133
1 Claim. (Cl. 244—103)

This invention relates to the use of air in motion to generate useful rotative power, and more particularly, to the use of such rotative power for rotating the landing wheels of an aircraft preparatory to landing.

Patents have been granted to several inventors for a variety of ideas for prerotating the landing wheels of an aircraft. For various reasons none of these ideas have proved to be satisfactory. None has been adopted by aircraft manufacturers. Neither commercial nor military aircraft are delivered equipped with prerotation equipment in spite of the many attempts that have been made to solve this problem.

When an aircraft lands without prerotation, there are three principal stresses to be dealt with. First is the stress of the landing wheels making contact with the runway. Second is the stress of the wheels being forced to accelerate instantly from at rest to the rate of rotation required by the landing speed of the aircraft. Third is the stress of the tires and landing gear gradually accepting the weight of the aircraft as the speed diminishes and the wings lose lift.

The third stress which develops gradually is of no great concern nor is the first when the touchdown is skillfully executed. But the second stress occurs simultaneously with the first and is by far the most serious and potentially damaging of the three because of the severe wrenching effect on the tires and landing gear.

When an aircraft with wheels four feet in diameter touches down at 150 miles per hour the wheels must accelerate instantly from at rest to about 17 revolutions per second. The friction of the tires rubbing the runway at the instant of acceleration usually creates a sharp squealing sound that can be heard at a distance of several hundred feet. Sufficient heat is generated to produce smoke and sometimes flame and broad smears of rubber several feet in length are usually deposited on the runway. The rubber lost to the smears makes the tires out of balance and out of round, and their useful life is greatly reduced. One writer on this subject stated that on a certain carrier-based type of aircraft only about 25 landings could be safely made without a change of tires.

When an aircraft makes a landing with prerotation at or near the required rate, the second and most potentially damaging stress is almost completely eliminated. Landings are smoother. There is greater safety. Tires last longer, and the stress and potential strain to the landing gear is greatly diminished. Maintenance and operating expense are reduced.

The most desirable means of prerotating aircraft wheels is to extract the necessary power from the airstream as the aircraft moves forward through the air. This has been the approach used by most inventors although others have employed electric motors in various ways and even small rockets fastened to the wheel-rims and provided with electrical ignition.

The idea described on the accompanying drawings and in the below description thereof also uses the idea of extracting the necessary power from the airstream but employs a different principle than proposed heretofore. This new principle makes it possible to apply a 360 degree rotative effort to an aircraft wheel instead of an estimated up to 90 degree effort that has been possible up to this time.

In this solution to the prerotation problem it is considered desirable but not essential that the several wheels in the landing gear rotate at the same speed nor is it considered essential that the peripheral speed of the wheels be the same as the landing speed of the aircraft. Any wheel prerotation speed in the correct direction at the instant of touchdown is better than a wheel at rest provided, of course, there is not excessive over-speed.

The idea of starting and rotating the wheels of an aircraft in flight is a fairly simple problem. There is a certain mass to be moved and a certain amount of bearing friction to be overcome. There is also the flettner effect, i.e. the tendency of the airstream itself to prevent the wheel from rotating. Required is a sufficient number of ounce-inches or foot-pounds of torque to overcome the total resistance to rotation.

One source states the landing gear on a commercial Jet aircraft (DC 8 etc.) may be lowered at a speed of 230 knots. At this speed the airstream against a perpendicular surface translates into a wind pressure of 2.44 pounds per square inch. Thus if 24.40 foot-pounds of torque are necessary to overcome the total resistance of a wheel to rotation, 10 square inches of surface perpendicular to the airstream is necessary with an effective lever-arm of one foot. That is possible with this device.

When an aircraft equipped with this device is preparing to land, dropping the landing gear into the airstream brings the device into operation and the wheels begin to rotate. No attention by the pilot is required before, during or after the landing.

A principal object of this invention is to provide an air-driven means of producing useful rotative power.

Another principal object of this invention is to provide an air-driven means of rotating the landing wheels of an aircraft prior to landing.

Another object is to provide a means of prerotation that is effective with larger and heavier wheels as well as smaller and lighter wheels.

Another object is to provide a means of prerotation that can be tested while the aircraft is in the hangar.

Another object is to provide a means of prerotation that is simple in design, effective in operation, light in weight and low in cost.

Another object is to provide a means of prerotation that requires no attention, adjustments, regulation or maintenance either before, during or after a landing.

Another object is to provide a means of prerotation that is compatible with contemporary landing gear design.

These and other objects will become clear when viewed in the light of the following specifications, accompanying drawings and appended claim.

These are four principal parts to this device: air-scoop, cover-plate, air-distributor assembly and torque ring. The air-distributor assembly parts are: air-chamber and air-distributor tubes. The torque-ring which is L-shaped in cross-section attaches to the aircraft wheel-rim and rotates with it while the other parts attach to the end of the wheel axle and remain stationary.

This device when mounted on an aircraft wheel and axle would appear from the side as shown on the drawings in FIG. 1 and from the front as in FIG. 2. Numeral 1 is a truck-beam. Numeral 2 is an axle. Numeral 3 is a tire. Numeral 4 is a wheel-rim.

FIG. 3 is an enlarged view of FIG. 1 with the tire omitted and part of the air-scoop and cover-plate cut away to show the above mentioned principal parts in their proper relationship. Numeral 5 is an air-scoop. Numeral 6 is a cover-plate. Numeral 7 is an air-chamber. Numeral 8 is an air-distributor tube. Numeral 9 is a torque-ring. Numeral 10 is a torque-ring bucket.

Figure 1:
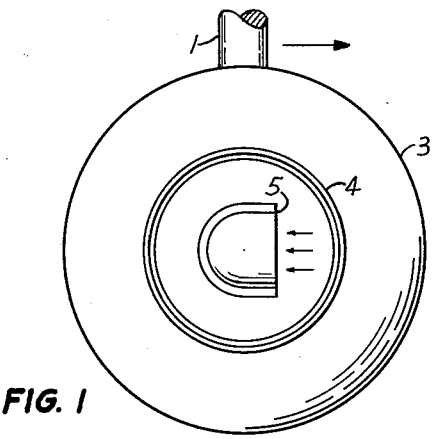
Figure 2:
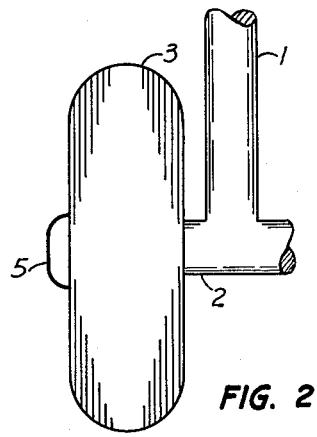
Figure 3:
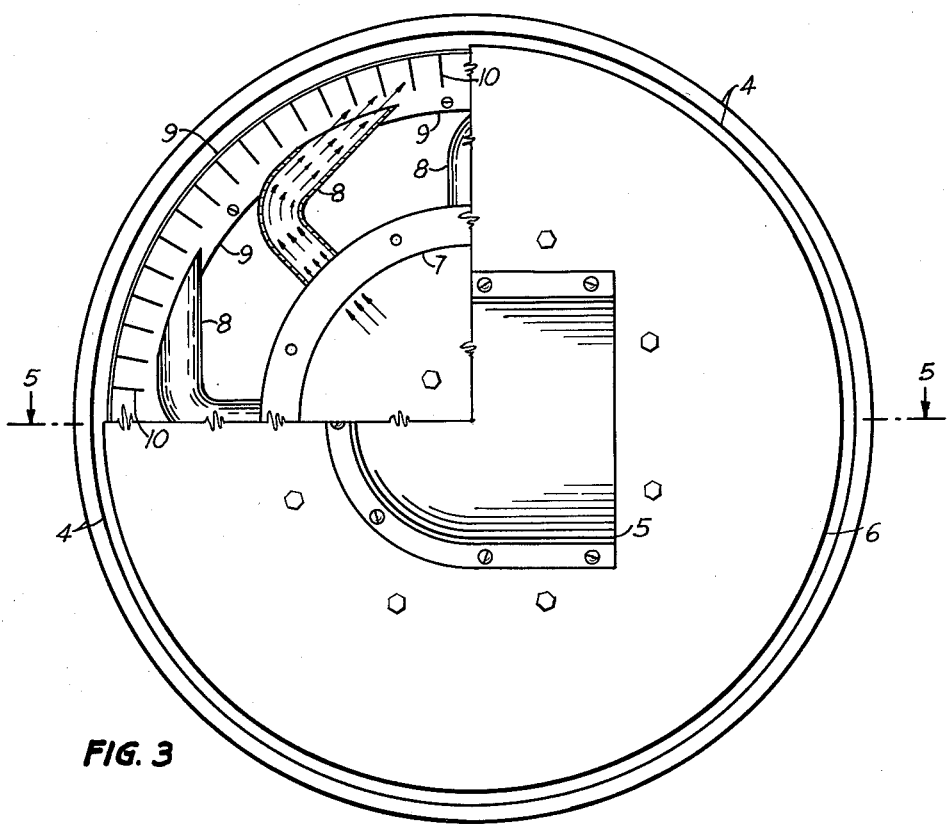
Figure 4:
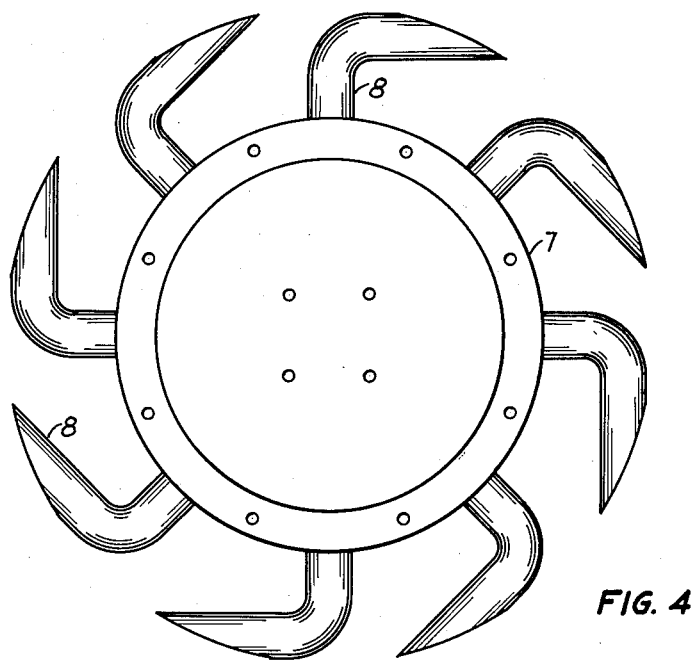
FIG. 4 is a view of the air-distributor assembly.
Figure 5:
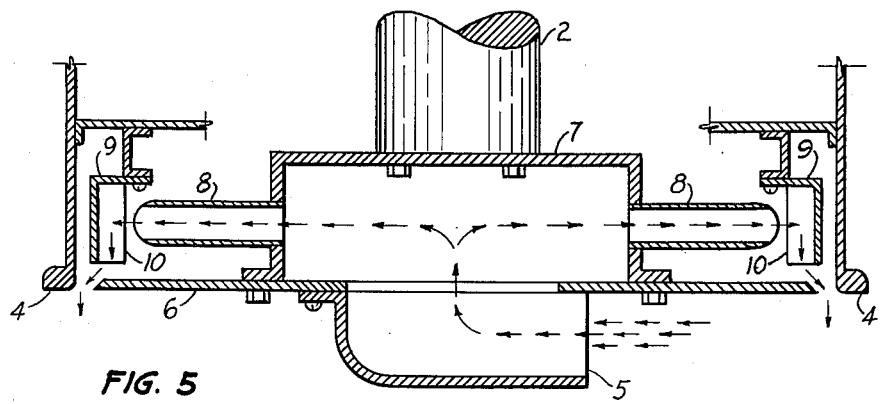
FIG. 5 is a sectional view on line 5—5 of FIG. 3 and shows the flow of air from the airstream into the air-scoop, into the air-chamber, through the air-distributor tubes to the plurality of places where the air impinges the torque-ring buckets, thereby generating power to rotate the wheel, after which it returns to the airstream, flowing between the wheel-rim and the periphery of the cover-plate.

Although the version of the device shown on the drawings provides for only eight-air-distributor tubes, it is obviously feasible to double or triple this number. Further, two or even three air-distributor assemblies could be stacked and used with two or three torque-rings to increase the amount of torque if necessary.

Various advantages of the above described device will be apparent to those skilled in the art. Following are several:

(A) Unique in this design is the feature of the air flowing through the device being divided in the air-distributor assembly so that air impinges the torque-ring buckets with equal force at the discharge end of all the air-distributor tubes, thus imparting a continuous, even 360 degree rotative effort to the torque-ring and the aircraft wheel to which it is secured.

(B) Each of the four major parts of this device may be made of plastic or light weight metal.

(C) This device may be applied to some existing aircraft axles and wheels with a minimum of alteration and expense.

(D) Inherent in this device is the advantage of in-the-hangar testing, plus regulation of the prerotation speed by installing an adjustable damper in the air-scoop or by varying the number, size and shape of the air-distributor tubes or by varying the number, shape, size and positioning of the torque-ring buckets. Also, greatly increased torque may be achieved by stacking two or three air-distributor assemblies and using two or three torque-rings.

It is to be understood that the form of my invention as shown on the drawings and as described in these specifications is to be taken as a preferred example of the same and that various changes in the size, shape, number and arrangement of parts, methods of mounting, fastening and joining together of the various components as well as the addition of dampers, valves and baffles may be resorted to without departing from the spirit of my invention or the scope of the appended claim.

Having described my invention, I claim the following:

In combination with an aircraft landing-gear assembly including a wheel-axle of the cantilever-spindle type and an aircraft landing-wheel mounted for rotation thereon, an air-craft landing-wheel rotating means consisting of a torque-ring composed of an L-shaped in cross-section peripheral ring which has a plurality of substantially flat torque-ring buckets radially disposed and perpendicularly mounted thereon, said torque-ring secured for rotation to the rim of said landing-wheel; and secured to the end of said wheel-axle an air-distributor assembly composed of an air-chamber substantially cylindrical in shape, closed at the end which is secured to said wheel-axle and open at the other, and, secured to and extending radially outward from the cylindrical wall of said air-chamber and positioned to coincide with openings through said wall a plurality of air-distributor tubes shaped and positioned with the outer ends terminating in a beveled arc closely adjacent to the inner edges of said torque-ring buckets; and secured to the open end of said air-chamber a circular flat cover-plate of a diameter substantially equal to that of said torque-ring, said cover-plate having a circular opening through and at the center thereof; and secured to the outer face of said cover-plate and positioned over said circular opening an air-scoop having an open mouth and an air passageway extending rearward from the direction of flight to discharge into the opening through the said cover-plate.

References Cited in the file of this patent
UNITED STATES PATENTS

| | | |
|---|---|---|
| 2,370,316 | Juul | Feb. 27, 1945 |
| 2,777,651 | Gates | Jan. 15, 1957 |